(12) United States Patent
Alet Vidal et al.

(10) Patent No.: US 9,237,829 B2
(45) Date of Patent: Jan. 19, 2016

(54) COOKING HOB WITH ROTARY DRIVING MEANS AND COOKING VESSEL USABLE WITH SAID HOB

(75) Inventors: Josep Alet Vidal, Oliana (ES); Lluís Trench Roca, Oliana (ES); Fidel Montraveta Montraveta, Oliana (ES)

(73) Assignee: ELECTRODOMESTICOS TAURUS, SL (ES)

( * ) Notice: Subject to any disclaimer, the term of this patent is extended or adjusted under 35 U.S.C. 154(b) by 26 days.

(21) Appl. No.: 13/701,828

(22) PCT Filed: May 10, 2012

(86) PCT No.: PCT/ES2012/000132
§ 371 (c)(1),
(2), (4) Date: Jan. 25, 2013

(87) PCT Pub. No.: WO2012/168506
PCT Pub. Date: Dec. 13, 2012

(65) Prior Publication Data
US 2014/0203010 A1    Jul. 24, 2014

(30) Foreign Application Priority Data
Jun. 7, 2011 (ES) .................................. 201100642

(51) Int. Cl.
*H05B 6/12* (2006.01)
*A47J 43/07* (2006.01)
(Continued)

(52) U.S. Cl.
CPC ............ *A47J 43/0777* (2013.01); *A47J 27/004* (2013.01); *A47J 43/0465* (2013.01); *A47J 43/085* (2013.01); *B01F 13/0033* (2013.01); *B01F 13/045* (2013.01);
(Continued)

(58) Field of Classification Search
CPC ............ B01F 13/0033; B01F 13/0872; B01F 13/045; B01F 15/00175; B01F 15/00779; B01F 15/067; A47J 43/085; A47J 43/0777; A47J 43/07; A47J 27/00; A47J 27/004; A47J 43/0465; H05B 6/12; H05B 6/129
USPC .............................. 219/621; 99/326, 334, 348
See application file for complete search history.

(56) References Cited

U.S. PATENT DOCUMENTS 2,282,866 A * 5/1942 Hagen ........................... 366/205
2,459,224 A * 1/1949 Hendricks ..................... 366/274
(Continued)

FOREIGN PATENT DOCUMENTS

EP    2286907 A1    2/2011

*Primary Examiner* — Eric Stapleton
(74) *Attorney, Agent, or Firm* — Hess Patent Law Firm LLC; Robert J. Hess

(57) ABSTRACT

The hob (1) comprises a support plate (2) which has a treatment area (3) and the cooking vessel (50) has rotary blades (53) connected to an upper magnetic coupling member (54). Below the plate (2) of the hob (1) there is a lower magnetic coupling member (4) rotatably driven by an actuator (6) to magnetically transmit torque to the upper magnetic coupling member (54) of the vessel (50). The hob (1) includes a lower magnetic element (8) below the plate (2) and the vessel has an upper magnetic element (58), which are at the same predetermined distance from the rotating shafts (E1, E2) of the respective magnetic coupling members. When the vessel (50) is in a predetermined angular position, the magnetic attraction between the lower and upper magnetic elements (8, 58) applies opposition to the rotation of the vessel (50).

6 Claims, 4 Drawing Sheets

(51) Int. Cl.

| | |
|---|---|
| *A47J 27/00* | (2006.01) |
| *B01F 13/00* | (2006.01) |
| *B01F 13/08* | (2006.01) |
| *A47J 43/08* | (2006.01) |
| *B01F 13/04* | (2006.01) |
| *B01F 15/00* | (2006.01) |
| *B01F 15/06* | (2006.01) |
| *A47J 43/046* | (2006.01) |

(52) U.S. Cl.
CPC ...... *B01F 13/0872* (2013.01); *B01F 15/00175* (2013.01); *B01F 15/00779* (2013.01); *B01F 15/067* (2013.01); *H05B 6/12* (2013.01); *H05B 6/129* (2013.01)

(56) References Cited

U.S. PATENT DOCUMENTS

| | | | | |
|---|---|---|---|---|
| 2,518,758 A * | 8/1950 | Cook | | 366/274 |
| 2,548,035 A * | 4/1951 | May | | 220/632 |
| 2,619,331 A * | 11/1952 | Morrison, Jr. | | 335/285 |
| 2,932,493 A * | 4/1960 | Jacobs | | 366/274 |
| 3,113,228 A * | 12/1963 | Tolegian | | 310/103 |
| 3,168,294 A * | 2/1965 | Hasumura | | 366/206 |
| 3,172,645 A * | 3/1965 | Price, Jr. | | 366/273 |
| 3,356,349 A * | 12/1967 | Keppler | | 366/274 |
| 3,421,528 A * | 1/1969 | Gomez et al. | | 134/188 |
| 3,502,848 A * | 3/1970 | Fink | | 219/432 |
| 3,530,499 A * | 9/1970 | Schroeder | | 219/624 |
| 3,570,819 A * | 3/1971 | Rosinger | | 366/274 |
| 3,681,568 A * | 8/1972 | Schaefer | | 219/432 |
| 3,711,672 A * | 1/1973 | Moreland et al. | | 219/625 |
| 3,720,807 A * | 3/1973 | Ting | | 219/441 |
| 3,767,896 A * | 10/1973 | Ryan | | 219/438 |
| 3,790,346 A * | 2/1974 | Ritchie | | 422/64 |
| 3,843,857 A * | 10/1974 | Cunningham | | 219/622 |
| 3,853,048 A * | 12/1974 | Collins | | 99/572 |
| 3,869,596 A * | 3/1975 | Howie | | 219/438 |
| 4,162,855 A * | 7/1979 | Bender | | 366/274 |
| 4,209,259 A * | 6/1980 | Rains et al. | | 366/273 |
| 4,307,287 A * | 12/1981 | Weiss | | 219/442 |
| 4,308,443 A * | 12/1981 | Tucker et al. | | 219/627 |
| 4,317,016 A * | 2/1982 | Ito | | 219/622 |
| 4,417,506 A * | 11/1983 | Herbst et al. | | 99/348 |
| 4,453,068 A * | 6/1984 | Tucker et al. | | 219/625 |
| 4,467,162 A * | 8/1984 | Kondo et al. | | 219/622 |
| 4,476,946 A * | 10/1984 | Smith | | 177/144 |
| 4,537,332 A * | 8/1985 | Brown et al. | | 222/190 |
| 4,587,406 A * | 5/1986 | Andre | | 219/497 |
| 4,725,149 A * | 2/1988 | Kawakami et al. | | 366/141 |
| 4,747,696 A * | 5/1988 | McCrory et al. | | 366/307 |
| 4,806,020 A * | 2/1989 | Matsuda | | 366/273 |
| 4,836,826 A * | 6/1989 | Carter | | 464/29 |
| 4,913,555 A * | 4/1990 | Maeda et al. | | 366/205 |
| 4,924,591 A * | 5/1990 | Brodu | | 33/203.14 |
| 4,952,069 A * | 8/1990 | Boulard | | 366/312 |
| 4,991,973 A * | 2/1991 | Maaz et al. | | 366/141 |
| 5,019,680 A * | 5/1991 | Morino et al. | | 219/730 |
| 5,048,402 A * | 9/1991 | Letournel et al. | | 99/348 |
| 5,061,079 A * | 10/1991 | Shiobara | | 366/127 |
| 5,228,381 A * | 7/1993 | Virgilio et al. | | 99/331 |
| 5,280,152 A * | 1/1994 | Lee | | 219/622 |
| 5,364,184 A * | 11/1994 | Rains | | 366/273 |
| 5,368,390 A * | 11/1994 | Gambrill et al. | | 366/273 |
| 5,393,142 A * | 2/1995 | Meier | | 366/274 |
| 5,407,272 A * | 4/1995 | Meier | | 366/274 |
| 5,470,152 A * | 11/1995 | Rains | | 366/273 |
| 5,478,149 A * | 12/1995 | Quigg | | 366/273 |
| 5,520,094 A * | 5/1996 | Lu | | 99/327 |
| 5,543,166 A * | 8/1996 | Masel et al. | | 426/523 |
| 5,549,382 A * | 8/1996 | Correia et al. | | 366/144 |
| 5,636,923 A * | 6/1997 | Nejat-Bina | | 366/205 |
| 5,684,712 A * | 11/1997 | Goffe et al. | | 700/285 |
| 5,711,602 A * | 1/1998 | Rohring et al. | | 366/251 |
| 5,758,965 A * | 6/1998 | Gambrill et al. | | 366/273 |
| 5,779,359 A * | 7/1998 | Gambrill et al. | | 366/273 |
| 5,806,410 A * | 9/1998 | Muchin et al. | | 99/422 |
| 5,829,341 A * | 11/1998 | Lin | | 99/326 |
| 5,834,739 A * | 11/1998 | Lockwood et al. | | 219/468.1 |
| 5,860,559 A * | 1/1999 | Wang | | 220/737 |
| 5,951,900 A * | 9/1999 | Smrke | | 219/497 |
| 6,065,865 A * | 5/2000 | Eyraud et al. | | 366/273 |
| 6,076,957 A * | 6/2000 | Gomes | | 366/274 |
| 6,095,677 A * | 8/2000 | Karkos et al. | | 366/274 |
| 6,206,562 B1 * | 3/2001 | Eyraud et al. | | 366/273 |
| 6,318,247 B1 * | 11/2001 | Di Nunzio et al. | | 99/348 |
| 6,416,215 B1 * | 7/2002 | Terentiev | | 366/273 |
| 6,543,928 B2 * | 4/2003 | Beebe | | 366/144 |
| 6,550,372 B1 * | 4/2003 | Sharples | | 99/331 |
| 6,568,844 B1 * | 5/2003 | Arthun et al. | | 366/274 |
| 6,712,497 B2 * | 3/2004 | Jersey et al. | | 366/274 |
| 6,758,593 B1 * | 7/2004 | Terentiev | | 366/273 |
| 6,793,167 B2 * | 9/2004 | Karkos et al. | | 241/101.2 |
| 6,805,312 B2 * | 10/2004 | Capp | | 241/36 |
| 6,837,613 B2 * | 1/2005 | Terentiev | | 366/273 |
| 6,962,433 B2 * | 11/2005 | Nichols et al. | | 366/274 |
| 6,988,825 B2 * | 1/2006 | Coville et al. | | 366/273 |
| 7,018,091 B2 * | 3/2006 | Arroubi et al. | | 366/199 |
| 7,086,778 B2 * | 8/2006 | Terentiev | | 366/273 |
| 7,105,780 B2 * | 9/2006 | De'Longhi | | 219/436 |
| 7,153,021 B2 * | 12/2006 | Goodwin et al. | | 366/273 |
| 7,160,023 B2 * | 1/2007 | Freude et al. | | 366/273 |
| 7,168,848 B2 * | 1/2007 | Gigas et al. | | 366/270 |
| D539,080 S * | 3/2007 | Zhiwen et al. | | D7/384 |
| 7,217,028 B2 * | 5/2007 | Beesley | | 366/199 |
| 7,238,921 B2 * | 7/2007 | Beesley | | 219/386 |
| 7,278,779 B2 * | 10/2007 | Beesley et al. | | 366/205 |
| D560,963 S * | 2/2008 | Altheimer et al. | | D7/378 |
| 7,364,350 B2 * | 4/2008 | Coville et al. | | 366/273 |
| 7,396,153 B2 * | 7/2008 | Andersson | | 366/273 |
| 7,481,572 B2 * | 1/2009 | Terentiev | | 366/279 |
| 7,488,919 B2 * | 2/2009 | Gagas et al. | | 219/400 |
| 7,516,650 B2 * | 4/2009 | Discenzo | | 73/53.01 |
| 7,581,434 B1 * | 9/2009 | Discenzo et al. | | 73/53.01 |
| 7,669,517 B2 * | 3/2010 | Boussemart et al. | | 99/287 |
| 7,687,941 B2 * | 3/2010 | Raghuprasad | | 307/151 |
| 7,744,026 B2 * | 6/2010 | Gregory et al. | | 241/92 |
| 7,762,716 B2 * | 7/2010 | Terentiev et al. | | 366/273 |
| 7,784,638 B2 * | 8/2010 | Kishbaugh et al. | | 220/573.3 |
| 7,815,362 B2 * | 10/2010 | Myhrberg et al. | | 366/273 |
| D638,653 S * | 5/2011 | Borin | | D7/326 |
| 7,950,842 B2 * | 5/2011 | Pryor et al. | | 366/142 |
| 7,959,347 B2 * | 6/2011 | Pryor et al. | | 366/142 |
| D641,197 S * | 7/2011 | Borin | | D7/326 |
| 7,993,694 B2 * | 8/2011 | Goderiaux et al. | | 426/438 |
| 8,042,990 B2 * | 10/2011 | Pryor et al. | | 366/197 |
| 8,066,426 B2 * | 11/2011 | Sandford et al. | | 366/205 |
| 8,123,199 B2 * | 2/2012 | Terentiev et al. | | 261/93 |
| 8,162,532 B2 * | 4/2012 | Toole | | 366/165.2 |
| 8,172,453 B2 * | 5/2012 | Boussemart et al. | | 366/145 |
| 8,198,853 B2 * | 6/2012 | Savitz | | 318/772 |
| 8,212,192 B2 * | 7/2012 | Tominaga et al. | | 219/620 |
| 8,282,268 B2 * | 10/2012 | Karkos et al. | | 366/273 |
| 8,402,886 B2 * | 3/2013 | Herren | | 99/510 |
| 8,635,948 B2 * | 1/2014 | Herren | | 99/537 |
| 8,729,434 B2 * | 5/2014 | Tominaga et al. | | 219/620 |
| 8,733,239 B2 * | 5/2014 | Allen | | 99/537 |
| 8,796,599 B2 * | 8/2014 | Sakakibara et al. | | 219/627 |
| 8,803,048 B2 * | 8/2014 | Bassill et al. | | 219/647 |
| 9,035,223 B2 * | 5/2015 | Noguchi et al. | | 219/660 |
| 2001/0036124 A1 * | 11/2001 | Rubenstein | | 366/205 |
| 2002/0027175 A1 * | 3/2002 | Capp | | 241/199.12 |
| 2003/0197080 A1 * | 10/2003 | Karkos et al. | | 241/92 |
| 2004/0245238 A1 * | 12/2004 | De'Longhi | | 219/439 |
| 2005/0072310 A1 * | 4/2005 | Kim | | 99/348 |
| 2005/0183582 A1 * | 8/2005 | McFadden et al. | | 99/348 |
| 2005/0229789 A1 * | 10/2005 | De'Longhi | | 99/348 |
| 2006/0146645 A1 * | 7/2006 | Rosener | | 366/274 |
| 2007/0221068 A1 * | 9/2007 | Boussemart et al. | | 99/279 |
| 2008/0047954 A1 * | 2/2008 | McFadden et al. | | 219/494 |
| 2009/0194526 A1 * | 8/2009 | Buchanan | | 219/600 |
| 2010/0051608 A1 * | 3/2010 | Tominaga et al. | | 219/621 |
| 2010/0065550 A1 * | 3/2010 | Tominaga et al. | | 219/622 |
| 2010/0065551 A1 * | 3/2010 | Tominaga et al. | | 219/622 |

(56) References Cited

U.S. PATENT DOCUMENTS

| | | |
|---|---|---|
| 2010/0214867 A1* | 8/2010 | Karkos et al. ............. 366/272 |
| 2011/0000903 A1* | 1/2011 | Noguchi et al. ............ 219/620 |
| 2011/0000904 A1* | 1/2011 | Sakakibara et al. ......... 219/624 |
| 2011/0132900 A1* | 6/2011 | Kinoshita et al. ........... 219/647 |
| 2013/0001220 A1* | 1/2013 | Alet Vidal et al. .......... 219/622 |
| 2013/0028044 A1* | 1/2013 | Karkos et al. ............. 366/274 |
| 2013/0042767 A1* | 2/2013 | Alet Vidal et al. ........... 99/357 |
| 2013/0168385 A1* | 7/2013 | Alet Vidal et al. .......... 219/647 |
| 2014/0203010 A1* | 7/2014 | Alet Vidal et al. .......... 219/621 |
| 2014/0312026 A1* | 10/2014 | Trench Roca et al. ..... 219/462.1 |

* cited by examiner

COOKING HOB WITH ROTARY DRIVING MEANS AND COOKING VESSEL USABLE WITH SAID HOB

FIELD OF THE ART

The present invention relates to a cooking hob provided with a continuous support plate, made for example of glass, glass ceramic or the like, and rotary driving means located below the support plate for driving rotary blades or paddles installed in a cooking vessel located on a treatment area of the support plate. The present invention also relates to a cooking vessel usable with said cooking hob.

BACKGROUND OF THE INVENTION

U.S. Pat. No. 5,549,382 describes a cooking hob provided with a support plate having with several cooking areas, in each of which a cooking vessel can be supported. The hob includes heating means associated with each cooking area and driving means aligned with one of the cooking areas. The driving means comprise a motor which rotates a lower magnetic coupling member located below the support plate in a position close enough to it to magnetically transmit torque to an upper magnetic coupling member attached to a stirrer located inside a cooking vessel placed on the corresponding cooking area.

Document DE-A-1131372 discloses a cooking hob comprising magnetic coupling between a lower magnetic coupling member rotatably driven by a motorised driving device and an upper magnetic coupling member connected to rotary blades or paddles installed inside a vessel. The magnetic coupling is established through a support plate on which the vessel rests.

Patent application DE-A-102006052475 discloses a cooking hob provided with a glass, glass ceramic or the like support plate with several cooking areas associated with heating means, where one of the cooking areas includes a lower magnetic coupling member rotatably driven by a motor to establish magnetic coupling through the support plate with an upper magnetic coupling member attached to a stirrer located inside a vessel placed on one of the cooking areas to rotate the stirrer inside the vessel.

A drawback of these cooking hobs equipped with a substantially smooth support plate and driving means to rotate a lower magnetic element and thereby establish magnetic coupling through the support plate is that if for any reason the rotary blades or paddles increase resistance to rotation or are locked inside the vessel, for example due to the conditions of the food being processed, then the entire vessel tends to rotate on the support plate being pushed by the driving means with the risk of ruining the culinary preparation inside the vessel, scratching the support plate or even causing an accident.

Documents DE-A-3000593, DE-A-3836099, EP-A-0725556, WO-A-9631739, U.S. Pat. No. 4,587,406 describe different wireless communication systems for communicating between a cooking vessel and a cooking hob provided with a cooking area with electric heating means on which the vessel is placed for the purpose of transmitting data relating to the cooking conditions, especially the temperature in the vessel, and controlling the electric heating means according to the data received from the vessel by means of a control device.

An advantage of the cooking hobs provided with a continuous glass, glass ceramic or the like support plate is that the support plate has a very easy to clean smooth and completely cleared upper surface. Nevertheless, this smooth and cleared surface offers very little resistance to the rotation of the vessel. Accordingly, there is a need to provide means preventing the rotation of the vessel on the plate and means preventing the operation of the driving means if the vessel is not placed on the treatment area of the support plate in a predetermined angular position.

SUMMARY OF THE INVENTION

According to a first aspect, the present invention contributes to mitigating the aforementioned and other drawbacks providing a cooking hob with rotary driving means, comprising a support plate which has a treatment area capable of supporting a cooking vessel provided with rotary blades or paddles connected to an upper magnetic coupling member, a lower magnetic coupling member rotatably assembled below the support plate, and a drive actuator operatively connected for rotating said lower magnetic coupling member and magnetically transmitting torque to said upper magnetic coupling member of said cooking vessel.

The cooking hob of the present invention comprises a lower magnetic element installed below the support plate at a predetermined distance from a rotating shaft of the lower magnetic coupling member. This lower magnetic element creates a magnetic attractive force on an upper magnetic element located in the cooking vessel at the same predetermined distance from a rotating shaft of the upper magnetic coupling member when the cooking vessel is located in a predetermined angular position on the treatment area.

The magnetic attractive force between the lower and upper magnetic elements combined with the distance from them to the respective rotating shafts of the lower and upper magnetic coupling members creates a resistant torque which prevents the cooking vessel from rotating on the treatment area of the support plate due to a driving torque produced by the rotation of the lower coupling member when for any reason the rotary blades encounter resistance to rotation or are locked inside the cooking vessel, for example due to the conditions of the food which is being processed, provided that the driving torque does not exceed the resistant torque.

In one embodiment, the lower magnetic coupling member is assembled in a moving support, and a position change actuator is operatively connected to move said moving support between an operative position, in which the lower magnetic coupling member is close enough to the support plate to magnetically transmit said torque to the upper magnetic coupling member when the cooking vessel is located on the treatment area, and an inoperative position, in which the lower magnetic coupling member is far enough from the support plate so as to not transmit the torque.

In such case, the lower magnetic element is installed in the moving support such that when the moving support is in said operative position the lower magnetic element is close enough to the support plate to create said magnetic attractive force on the upper magnetic element of the cooking vessel, and when the moving support is in said inoperative position, the lower magnetic element is far enough from the support plate so as to not create the magnetic attractive force.

In one embodiment, the cooking hob further comprises a wireless energy emitting element installed in the moving support to emit a wireless energy supply that can be received by a wireless energy receiving element located in the cooking vessel for the purpose of supplying at least one electronic safety control circuit installed in the cooking vessel.

In one embodiment, the mentioned wireless energy emitting element comprises a lower coil supplied by a power supply. This lower coil is arranged in the moving support below the support plate in a position such that it is coaxial to a corresponding upper coil installed in the cooking vessel when the cooking vessel is located in said predetermined angular position on the treatment area.

Therefore, when the moving support is in the operative position and the cooking vessel is located in the predetermined angular position on the treatment area, the lower and upper coils are aligned and close enough to one another so that the lower coil, which is supplied by the power supply, establishes an electromagnetic coupling through the support plate with said upper coil of the cooking vessel, said upper coil acting as the mentioned wireless energy receiving element. When the moving support is in the inoperative position, the lower and upper coils are far enough from one another so as to not establish the electromagnetic coupling.

Furthermore, the cooking hob includes a wireless signal receiver arranged in a position below the support plate suitable for receiving a control signal emitted by a wireless signal emitter located in the cooking vessel when the cooking vessel is located in said predetermined angular position on the treatment area. This wireless signal emitter of the cooking vessel is in connection with the mentioned electronic safety control circuit, and said wireless signal receiver of the hob is in connection with an electronic control device configured for allowing, preventing or modifying the operation of the mentioned drive actuator, which drives the rotation of the lower magnetic coupling member, as a consequence of receiving or not receiving said control signal.

In one embodiment, the cooking hob further comprises heating means arranged below the support plate for heating the cooking vessel when it is located on the treatment area, in which case the mentioned electronic control device is further configured for allowing, preventing or modifying the operation of said heating means as a consequence of receiving or not receiving the control signal. In one embodiment, the heating means comprise an induction heating device in the form of a planar ring arranged adjacent to a lower surface of the support plate in the treatment area. This induction heating device has a central opening in which the lower magnetic coupling member is housed when the moving support is in the operative position to allow the lower magnetic coupling member to rotate as close as possible to the lower surface of the support plate.

In one embodiment, the lower magnetic element is a permanent magnet or a body made of a ferromagnetic material and the wireless signal receiver is an infrared receiver.

According to a second aspect, the present invention provides a cooking vessel usable with a cooking hob provided with rotary driving means, such as a cooking hob according to the first aspect of the present invention for example.

The mentioned cooking vessel comprises a vessel body configured for being placed on a treatment area of a support plate of said cooking hob, rotary blades or paddles installed inside said vessel body, and an upper magnetic coupling member connected to said rotary blades or paddles. The mentioned upper magnetic coupling member is rotated by a lower magnetic coupling member installed in the cooking hob below said support plate in said treatment area and rotatably driven by a drive actuator when the cooking vessel is placed on the treatment area.

The cooking vessel of the present invention is characterised in that it comprises an upper magnetic element fixed to the vessel body at a predetermined distance from a rotating shaft of said upper magnetic coupling member. This upper magnetic element is arranged for creating a magnetic attractive force on a lower magnetic element installed in the cooking hob below the support plate and at the same predetermined distance from a rotating shaft of the lower magnetic coupling member when the cooking vessel is located in a predetermined angular position on the treatment area.

According to that described above, the magnetic attractive force between the lower and upper magnetic elements combined with the distance from them to the respective rotating shafts of the lower and upper magnetic coupling members contributes to preventing the cooking vessel from rotating on the treatment area of the support plate.

In one embodiment, the cooking vessel comprises a wireless energy receiving element fixed to the vessel body in a suitable position for receiving a wireless energy supply emitted by a wireless energy emitting element installed in the cooking hob below the support plate. This wireless receiving element of the cooking vessel is capable of converting said wireless energy supply into electric power for supplying an electronic safety control circuit installed in the cooking vessel.

In one embodiment, the wireless energy receiving element comprises an upper coil arranged in a position such that said upper coil is coaxial and adjacent to a corresponding lower coil supplied by a power supply and arranged in the cooking hob below the support plate when the cooking vessel is located in said predetermined angular position on the treatment area. Therefore, the lower coil of the cooking hob, which is supplied by the power supply and acts as said wireless energy emitting element, establishes an electromagnetic coupling through the support plate with said upper coil of the cooking vessel, and it produces an electric current which is used for supplying the electronic safety control circuit.

The upper magnetic element and the upper coil are preferably located in an appendage fixed to said vessel body. More preferably, said appendage is adjacent to a bottom of the vessel body, such that the upper magnetic element and the upper coil are very close to an upper surface of the support plate of the hob when the bottom of the cooking vessel rests on it. In one embodiment, the mentioned appendage is connected to a handle fixed to the vessel body.

The cooking vessel usually comprises a lid configured for at least partially covering an upper opening of the vessel body. The mentioned lid is coupled to the vessel body in a correctly closed position and said electronic safety control circuit comprises a position sensor arranged for detecting a detectable element installed in said lid when the lid is in said correctly closed position. The cooking vessel further comprises a wireless signal emitter which emits a control signal representative of said correctly closed position of the lid, or of an incorrectly closed position of the lid, that can be received by a wireless signal receiver located in the hob below the support plate. The wireless signal receiver of the hob is in connection with an electronic control device configured for allowing, preventing or modifying the operation of the mentioned drive actuator which drives the rotation of the lower magnetic coupling member as a consequence of receiving or not receiving said control signal.

In one embodiment, the wireless signal emitter is fixed to the vessel body in a suitable position so that said control signal is received by said wireless signal receiver of the hob when the cooking vessel is located in said predetermined angular position on the treatment area. For example, the wireless signal emitter can be located in the same appendage fixed to said vessel body supporting the upper magnetic element and the upper coil. In one embodiment, the detectable element is a permanent magnet and said position sensor can be any device capable of detecting a magnetic field, such as a Reed relay or a Hall effect sensor. The wireless signal emitter can be an infrared emitter for example. The upper magnetic element is a permanent magnet or a body made of a ferromagnetic material.

The bottom of the vessel body is preferably configured for being heated by a heating device of the hob, and more preferably by an induction heating device of the hob when the vessel is located on the treatment area of the support plate of the hob.

The cooking vessel can include a temperature sensor for detecting the temperature of the vessel body and an identifier of the vessel type. In such case, the control signal emitted by the wireless signal emitter includes information relating to the temperature detected by the temperature sensor and information relating to the vessel type, such that the electronic control device can adapt the operation of the hob according to the data received by the wireless signal receiver.

BRIEF DESCRIPTION OF THE DRAWINGS

The foregoing and other advantages and features will be better understood from the following detailed description of one embodiment with reference to the attached drawings, in which.

DETAILED DESCRIPTION OF AN EXEMPLARY EMBODIMENT

Figure 1:
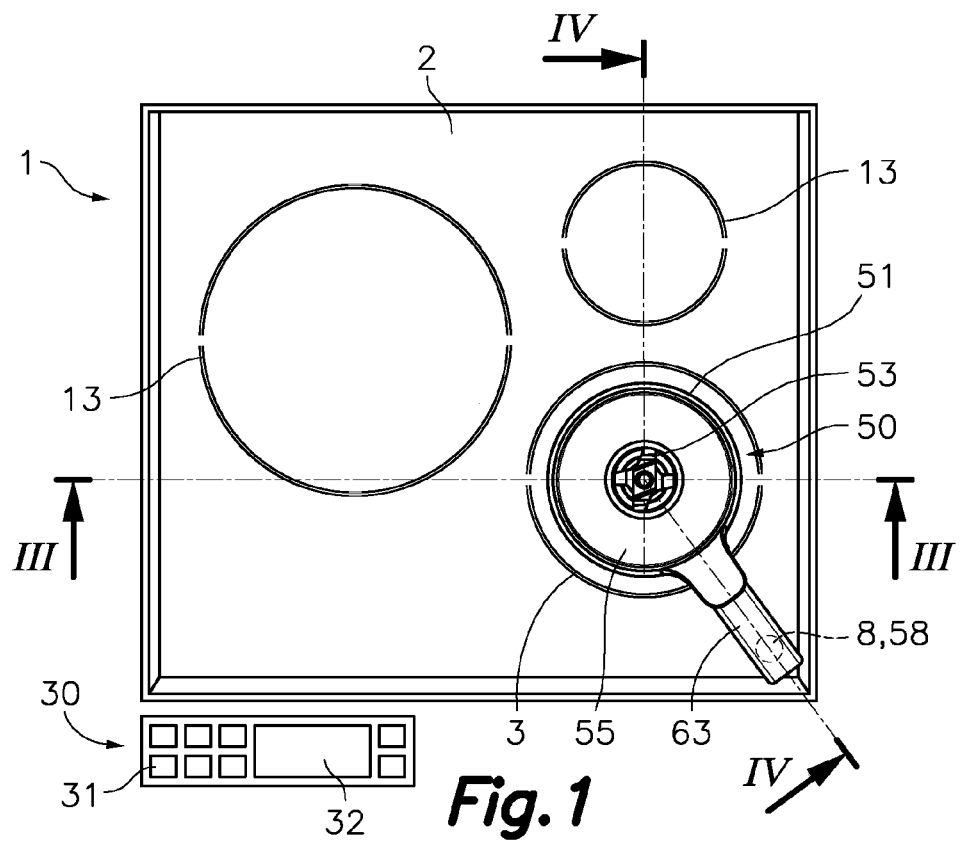
FIG. 1 is a top plan view of a cooking hob with rotary driving means according to an embodiment of a first aspect of the present invention and of a cooking vessel according to an embodiment of a second aspect of the present invention arranged on a treatment area of the cooking hob.
Figure 2:
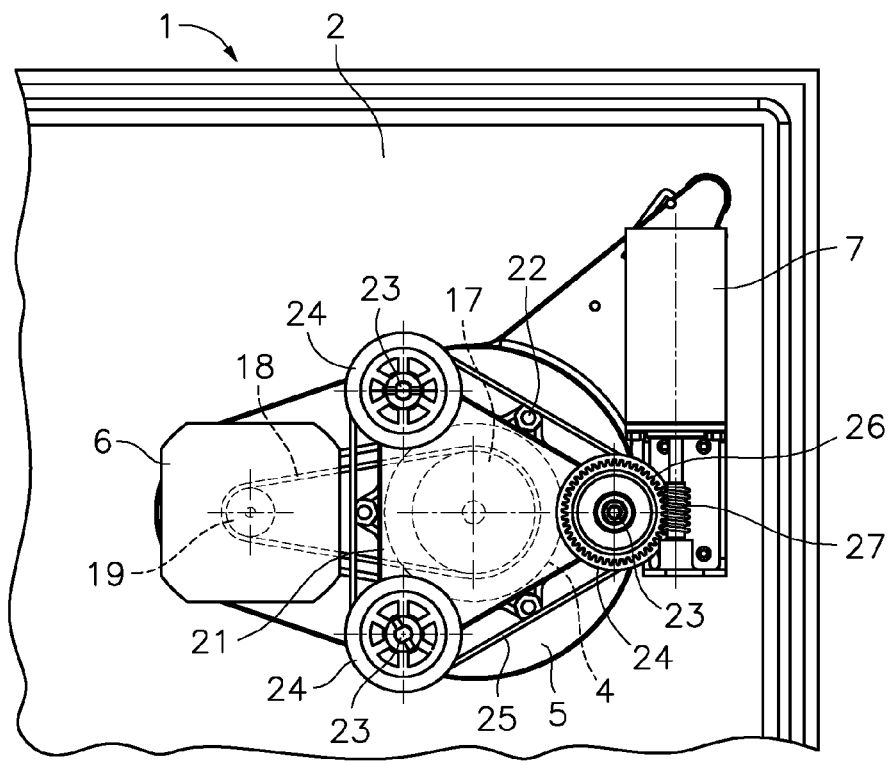
FIG. 2 is a partial bottom plan view of the treatment area of the cooking hob of FIG. 1.

Referring first to FIG. 1, reference number 1 generally designates a cooking hob with rotary driving means according to an embodiment of a first aspect of the present invention and reference number 50 generally designates a cooking vessel provided with rotary blades or paddles according to an embodiment of a second aspect of the present invention. The cooking hob 1 comprises a continuous support plate 2, made of glass, glass ceramic or the like, which has several cooking areas 13 and a treatment area 3 all of them indicated graphically. The cooking areas 13 are conventionally associated with respective heating means (not shown) located below the support plate 2.

Figure 3:
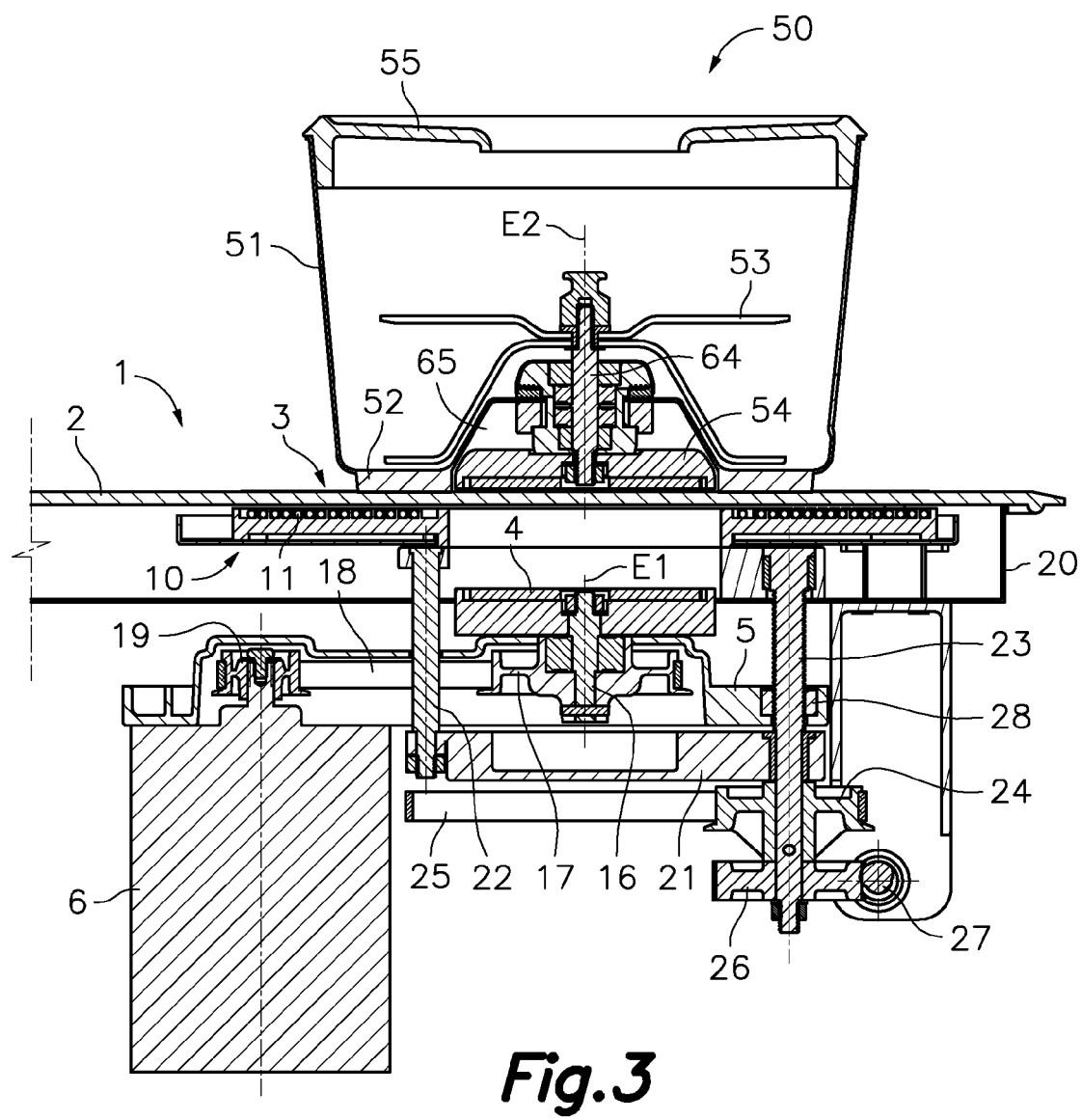
FIG. 3 is a partial cross-section view taken along plane III-III of FIG. 1.
Figure 4:
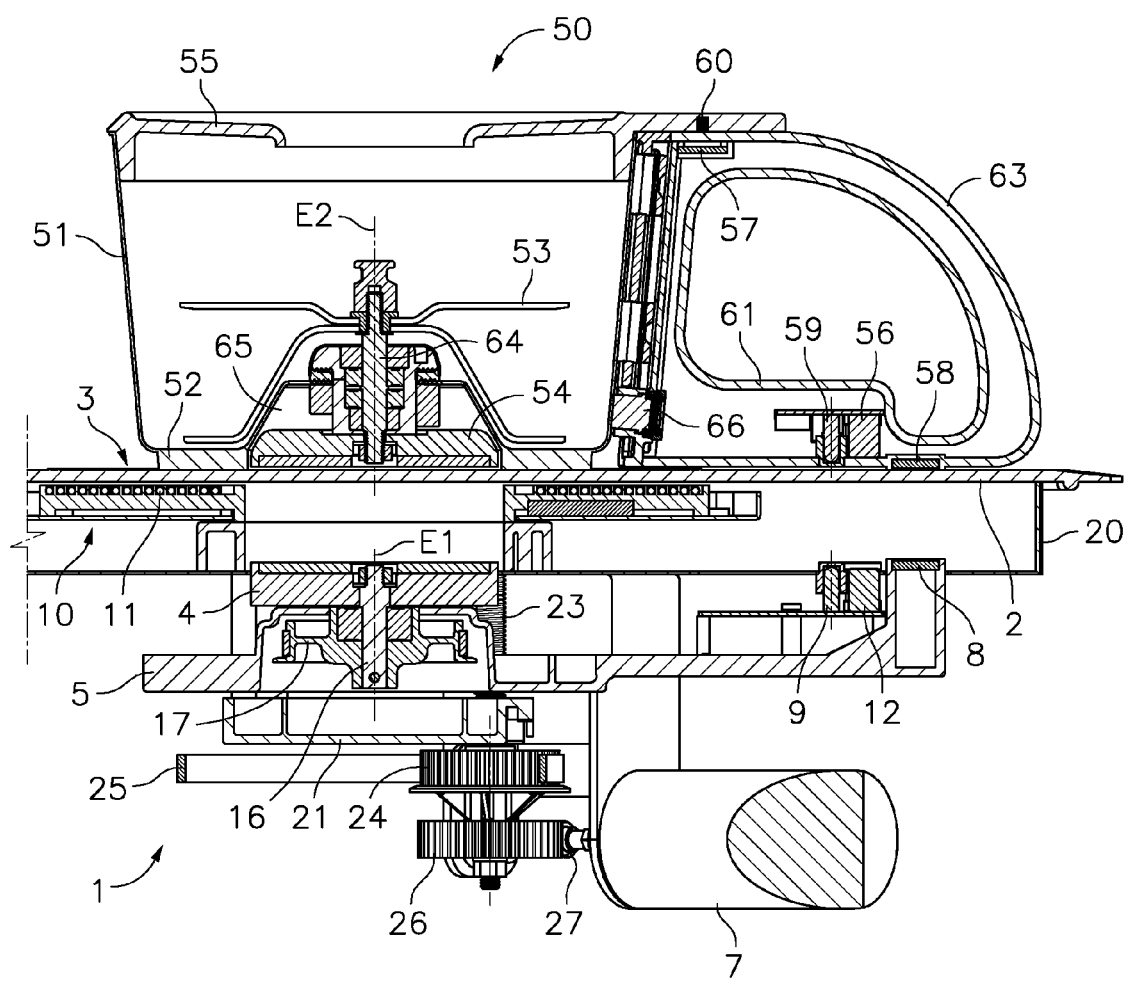
FIG. 4 is a partial cross-section view taken along plane IV-IV of FIG. 1 with a moving support in an inactive position.
Figure 5:
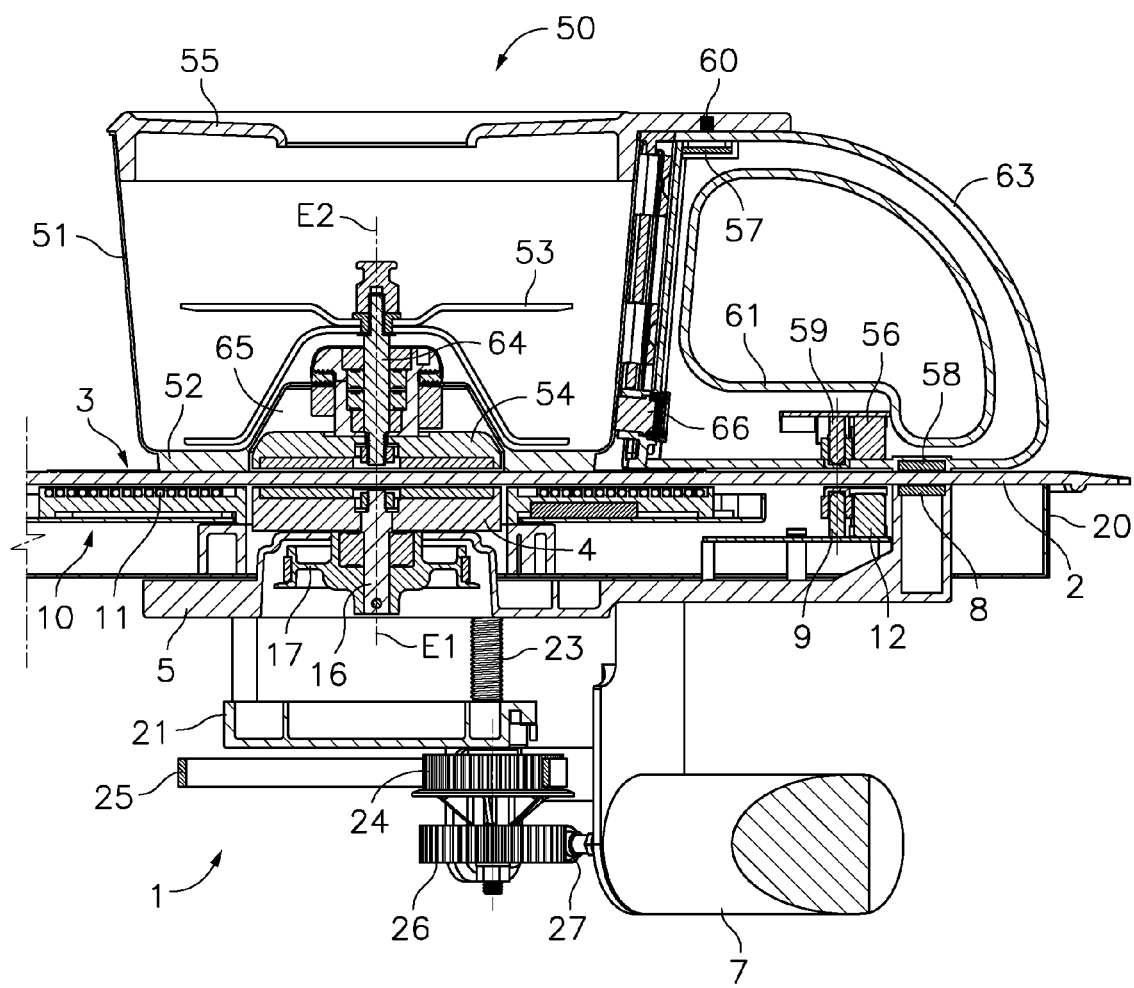
FIG. 5 is a partial cross-section view similar to FIG. 4, but with the moving support in an active position.

The treatment area 3 is configured for supporting the mentioned cooking vessel 50 which, as best shown in FIGS. 3, 4 and 5, comprises a vessel body 51 which has a bottom 52 configured for being heated by electromagnetic induction and an upper opening. Rotary blades or paddles 53 connected by means of a blade shaft 64 to an upper magnetic coupling member 54 housed in a concavity 65 formed in the bottom 52 are installed inside the vessel body 51. When the vessel body 51 rests on the support plate 2 the upper magnetic coupling member 54 is very close to the support plate 2 without contacting it. The rotary blades or paddles 53, the blade shaft 64 and the upper magnetic coupling member 54 can rotate integrally about an upper rotating shaft E2.

As shown in FIGS. 2 to 5, the support plate 2 of the cooking hob 1 is supported on a frame 20 and a fixed support 21 is fixed to said frame 20 by means of struts 22 maintaining said fixed support 21 located below the treatment area 3 of the support plate 2 and spaced from a lower surface of the support plate 2. The fixed support 21 supports three vertical screws 23 (only one of which is shown in FIGS. 3, 4 and 5) connected to respective position change pulleys 24 linked to one another by a position change belt 25. One of said screws 23 (FIGS. 2, 4 and 5) is further connected to a gear wheel 26 meshing with a cogwheel or worm screw 27 driven by a position change actuator 7, such as an electric motor.

There is located between the support plate 2 and the fixed support 21 a moving support 5, which has fixed thereto three nuts 28 (only one of which is shown in FIG. 4) respectively coupled to the three screws 23. Therefore, activation of the mentioned position change actuator 7 moves the moving support 5 between an upper active position (FIG. 5) and a lower inactive position (FIGS. 3 and 4).

A lower magnetic coupling member 4 is rotatably assembled in said moving support 5 below the support plate 2. The mentioned lower magnetic coupling member 4 is connected by means of a drive shaft 16 to a driven pulley 17. The lower magnetic coupling member 4, said drive shaft 16 and said driven pulley 17 can rotate integrally about a lower rotating shaft E1, which is centred in relation to the treatment area 3 of the support plate 2. The driven pulley 17 is connected by a drive belt 18 to a drive pulley 19 driven by a drive actuator 6, such as an electric motor, installed in said moving support 5. An activation of said drive actuator 6 thus rotates the lower magnetic coupling member 4.

When the moving support 5 is in said operative position (FIG. 5), the lower magnetic coupling member 4 is very close to a lower surface of the support plate 2 without contacting it. Therefore, when the cooking vessel 50 is located on the treatment area 3 and the moving support is in the operative position, the lower and upper rotating shafts E1, E2 are mutually aligned and the lower magnetic coupling member 4 is close enough to the support plate 2 to magnetically transmit torque to the upper magnetic coupling member 54 and to the rotary blades or paddles 53 of the cooking vessel 50. When the moving support 5 is in said inoperative position (FIGS. 3 and 4), the lower magnetic coupling member 4 is far enough from the support plate 2 so as to not transmit the mentioned torque.

As shown in FIGS. 4 and 5, the cooking hob 1 further comprises a lower magnetic element 8, which is installed in the moving support 5 below the support plate 2 at a predetermined distance from the mentioned lower rotating shaft E1 of the lower magnetic coupling member 4, and the cooking vessel 50 comprises an upper magnetic element 58 installed in an appendage 61 fixed to the vessel body 51 at the same predetermined distance from the mentioned upper rotating shaft E2 of the upper magnetic coupling member 54. For example, the appendage 61 can be located adjacent to the bottom 52 of the vessel body 51 and the cooking vessel 50 can include a handle 63 with an upper end fixed to the vessel body 51 close to the upper opening and a lower end connected to the appendage 61. When the moving support 5 is in the operative position, the lower magnetic element 8 is very close to the lower surface of the support plate 2 and when the cooking vessel 50 rests on the support plate 2, the upper magnetic element 58 is very close to the upper surface of the support plate 2.

The lower magnetic element 8 is located on the moving support 5 in a constant predetermined angular position about the lower rotating shaft E1, such that when the cooking vessel 50 is located on the treatment area 3 of the support plate 2 with the mentioned appendage 61 orientated such that the upper magnetic element 58 is in the same predetermined angular position as the lower magnetic element 8 (FIGS. 1, 4 and 5), the upper magnetic element 58 and the lower magnetic element 8 are mutually aligned.

Therefore, when the cooking vessel 50 is located on the treatment area 3 of the support plate 2 in the predetermined angular position and the moving support is in the operative position (FIG. 5), the lower magnetic element 8 of the cooking hob 1 creates a magnetic attractive force on the upper magnetic element 58 of the cooking vessel 50, and this magnetic attractive force combined with the distance from the lower and upper magnetic elements 8, 58 to the lower and upper rotating shafts E1, E2, which are also mutually aligned in this position, creates a resistant torque opposing the driving torque produced by the rotation of the lower coupling member 4 combined with the resistance to rotation of the rotary blades 53 inside the cooking vessel 50.

The mentioned driving torque tends to rotate the cooking vessel 50 on the treatment area 3 of the support plate 2 and increases when for any reason the rotary blades or paddles 53 encounter greater resistance to rotation or are locked inside the cooking vessel 50, for example due to the conditions of the food being processed. Accordingly, the resistant torque provided by the lower and upper magnetic elements 8, 58 prevents the cooking vessel 50 from rotating on the treatment area 3 of the support plate 2 provided that the driving torque does not exceed the resistant torque. The lower and upper magnetic elements 8, 58 can both be permanent magnets, or one of them can be a permanent magnet and the other a body made of a ferromagnetic material.

In the event that the rotary blades 53 encounter unusually large resistance to rotation or are locked inside the cooking vessel 50, the current consumed by the drive actuator 6 would accordingly increase. The cooking hob 1 includes an electronic control device connected to the drive actuator 6 and configured for stopping the operation of the drive actuator 6 when the current consumed by it increases above a predetermined threshold.

As shown in FIGS. 1, 3, 4 and 5, the cooking vessel 50 comprises a lid 55 configured for covering the mentioned upper opening of the vessel body 51 and an electronic safety control circuit configured for preventing or modifying the operation of the cooking hob 1 if the lid 55 is not coupled to the upper opening of the vessel body 51 in a correctly closed position. A detectable element 60 is installed in the lid, and the electronic safety control circuit comprises a position sensor 57 arranged for detecting said detectable element 60 when the lid 55 is in the correctly closed position and a wireless signal emitter 59 which emits a control signal representative of said correctly closed position of the lid 55. The cooking hob 1 comprises a wireless signal receiver 9 located below the support plate 2 and capable of receiving the control signal, and the mentioned electronic control device of the cooking hob 1 is further configured for allowing the operation of the drive actuator 6 only if the control signal is received.

For example, the detectable element 60 can be a permanent magnet and said position sensor 57 can be a Reed relay or a Hall effect sensor. For example, the wireless signal emitter 59 can be an infrared emitter and the wireless signal receiver 9 can be an infrared receiver. Optionally, the wireless signal emitter 59 can be installed in the appendage 61 of the cooking vessel 50 and the wireless signal receiver 9 can be installed in the moving support 5 such that wireless signal emitter 59 and the wireless signal receiver 9 are facing on opposite sides of the support plate 2 when the cooking vessel 50 is located on the treatment area 3 of the support plate 2 in the predetermined angular position, and very close to one another when the moving support 5 is furthermore in the operative position.

It will be understood that the electronic safety control circuit of the cooking vessel 50 can alternatively be configured for making the wireless signal emitter 59 emit the control signal if the lid 55 is in an incorrectly closed position and the electronic control device of the cooking hob 1 can be configured for preventing the operation of the drive actuator 6 if the control signal is received.

The cooking hob optionally includes heating means 10 arranged below the support plate 2 for heating the cooking vessel 50 when it is located on the treatment area 3. For example, these heating means 10 comprise an induction heating device 11 in the form of a planar ring arranged adjacent to a lower surface of the support plate 2 in the treatment area 3. The induction heating device 11 has a central opening in which the lower magnetic coupling member 5 is housed when the moving support 5 is in the operative position. Accordingly, the bottom 52 of the vessel body 51 of the cooking vessel 50 is configured for being heated by the induction heating device 11 of the cooking hob 1 when the vessel 50 is located on the treatment area 3 of the support plate 2 of the cooking hob 1. In such case, the electronic control device of the cooking hob 1 is further configured for allowing, preventing or modifying the operation of said heating means 10 as a consequence of said received or not received control signal.

For example, the cooking vessel 50 includes a temperature sensor 66 (FIGS. 4 and 5) for detecting the temperature of the vessel body 51 and an identifier of the vessel type, for example in the form of data stored in a memory of the electronic safety control circuit. The wireless signal emitter 59 is used to include information relating to the temperature detected by the temperature sensor 66 and information relating to the vessel type in the emitted control signal. Therefore, the operation of the cooking hob 1 is further adapted by the electronic control device to the vessel type and to the temperature of the vessel body 51 according to the control signal received by the wireless signal receiver 9 of the cooking hob 1.

The cooking hob 1 further comprises a wireless energy emitting element installed in the moving support 5. This wireless energy emitting element is configured for emitting a wireless energy supply that can be received by a wireless energy receiving element fixed to the vessel body 51 for supplying the electronic safety control circuit installed in the cooking vessel 50. For example, the wireless energy emitting element can have a lower coil 12 supplied by a power supply and said wireless energy receiving element can have a corresponding upper coil 56 installed in the appendage 61 of the cooking vessel 50 and in connection with the electronic safety control circuit.

The lower coil 12 is arranged in a position on the moving support 5 and below the support plate 2 such that when the cooking vessel 50 is located in said predetermined angular position on the treatment area 3 the lower coil 12 is coaxial with the upper coil 56. When the cooking vessel 50 is located in said predetermined angular position on the treatment area 3 the upper coil 56 is very close to the upper surface of the support plate 2, and when the moving support 5 is in the operative position (FIG. 5) the lower coil 12 is very close to the lower surface of the support plate 2. In this position, the lower coil 12 powered up by the power supply establishes an electromagnetic coupling with the upper coil 56 of the cooking vessel 50, and this produces an electric supply current in the upper coil which is used for supplying the electronic safety control circuit of the cooking vessel 50.

Going back to FIG. 1, the cooking hob 1 of the present invention includes a control panel 30 connected with the electronic control device and with an electric supply system of the cooking hob 1. For example, this control panel 30 comprises control buttons or keys 31 and a visual display 32 allowing a user to control the operation of the heating means associated with the cooking areas 13, the heating means 10 associated with the treatment area 3, and the drive actuator 6 which drives the rotation of the rotary blades or paddles inside the cooking vessel 50 when it is located on the treatment area 3 of the support plate 2.

A person skilled in the art will be able to introduce modifications and variations in the embodiment shown and described without departing from the scope of the present invention as it is defined in the attached claims.

The invention claimed is:

1. A cooking hob (1) with rotary driving means, comprising:
    a support plate (2) which has a treatment area (3) capable of supporting a cooking vessel (50) provided with rotary blades or paddles (53) connected to an upper magnetic coupling member (54);
    a lower magnetic coupling member (4) rotatably assembled on a moving support (5) below the support plate (2);
    a drive actuator (6) operatively connected for rotating said lower magnetic coupling member (4) and magnetically transmitting torque to said upper magnetic coupling member (54) of said cooking vessel (50), and
    a position change actuator (7) operatively connected to move said moving support (5) between an operative position, in which the lower magnetic coupling member (4) is close enough to the support plate (2) to magnetically transmit said torque to the upper magnetic coupling member (54) when the cooking vessel (50) is located on the treatment area (3), and an inoperative position, in which the lower magnetic coupling member (4) is far enough from the support plate (2) so as to be free from transmitting the torque;
    wherein at least one lower magnetic element (8) is installed on the moving support (5) below the support plate (2) at a predetermined distance from a lower rotating shaft (E1) of the lower magnetic coupling member (4) and at a constant predetermined angular position about said lower rotating shaft (E1) to create a magnetic attractive force on an upper magnetic element (58) installed in the cooking vessel (50) at said predetermined distance from an upper rotating shaft (E2) of the upper magnetic coupling member (54) when the cooking vessel (50) is located in a predetermined angular position on the treatment area (3) and when the moving support (5) is in said operative position.

2. The cooking hob according to claim 1, wherein a wireless energy emitting element is installed in the moving support (5) to emit a wireless energy supply that can be received by a wireless energy receiving element installed in the cooking vessel (50) for supplying at least one electronic safety control circuit installed in the cooking vessel (50).

3. The cooking hob according to claim 2, wherein said wireless energy emitting element comprises a lower coil (12) supplied by a power supply and arranged in a position below the support plate (2) in which said lower coil (12) is coaxial and adjacent to a corresponding upper coil (56) installed in the cooking vessel (50) when the moving support (5) is in said operative position and the cooking vessel (50) is located in said predetermined angular position on the treatment area (3) to establish a magnetic coupling with said upper coil (56) of the cooking vessel (50), said upper coil (56) acting as said wireless energy receiving element.

4. The cooking hob according to claim 3, wherein a wireless signal receiver (9) is arranged in a position below the support plate (2) suitable for receiving a control signal emitted by a wireless signal emitter (59) installed in the cooking vessel (50) in connection with said electronic safety control circuit when the cooking vessel (50) is located in said predetermined angular position on the treatment area (3), said wireless signal receiver (9) being in connection with an electronic control device configured for allowing, preventing or modifying the operation of said drive actuator (6) as a consequence of said received or not received control signal.

5. The cooking hob according to claim 4, wherein heating means (10) are arranged below the support plate (2) for heating the cooking vessel (50) when it is located on the treatment area (3), and said electronic control device is further configured for allowing, preventing or modifying the operation of said heating means (10) as a consequence of said received or not received control signal.

6. The cooking hob according to claim 5, wherein said heating means (10) comprise an induction heating device (11) in the form of a planar ring arranged adjacent to a lower surface of the support plate (2) in the treatment area (3), said induction heating device (11) having a central opening in which the lower magnetic coupling member (5) is housed when the moving support (5) is in the operative position.

* * * * *